US 7,558,860 B2

(12) United States Patent
Karnatz et al.

(10) Patent No.: US 7,558,860 B2
(45) Date of Patent: Jul. 7, 2009

(54) UPDATING OF SOFTWARE STORED IN A COMPUTER OF A DATA COMMUNICATION SYSTEM

(75) Inventors: Hans-Jürgen Karnatz, Fröndenberg (DE); Ulrich Leimkötter, Gelsenkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 528 days.

(21) Appl. No.: 10/527,433

(22) PCT Filed: Aug. 20, 2003

(86) PCT No.: PCT/DE03/02775

§ 371 (c)(1),
(2), (4) Date: Oct. 17, 2005

(87) PCT Pub. No.: WO2004/025924

PCT Pub. Date: Mar. 25, 2004

(65) Prior Publication Data

US 2006/0195555 A1 Aug. 31, 2006

(30) Foreign Application Priority Data

Sep. 10, 2002 (DE) ............................ 102 41 957

(51) Int. Cl.
*G06F 15/16* (2006.01)
*G06F 13/42* (2006.01)
(52) U.S. Cl. .................... 709/227; 709/249; 340/825
(58) Field of Classification Search ............... 709/219, 709/227, 249; 340/825
See application file for complete search history.

(56) References Cited

U.S. PATENT DOCUMENTS

| 5,901,320 | A  | * | 5/1999  | Takahashi et al. | ........... 717/170 |
| 5,999,741 | A  | * | 12/1999 | May et al.       | ............ 717/173 |
| 6,038,594 | A  | * | 3/2000  | Puente et al.    | ............ 709/217 |
| 6,084,874 | A  | * | 7/2000  | Nguyen et al.    | ............ 370/352 |
| 6,282,709 | B1 | * | 8/2001  | Reha et al.      | ............ 717/175 |
| 6,298,480 | B1 | * | 10/2001 | Beuk et al.      | ............ 717/171 |
| 6,324,693 | B1 | * | 11/2001 | Brodersen et al. | ........... 717/177 |
| 6,378,069 | B1 | * | 4/2002  | Sandler et al.   | ............ 713/153 |

(Continued)

FOREIGN PATENT DOCUMENTS

DE 196 45 368 A1 4/1998

(Continued)

OTHER PUBLICATIONS

H. Balakrishnan, V. N. Padmanabhan, G. Fairhurst, and M. Sooriyabandara. TCP performance implications of network path asymmetry. RFC 3449, Internet Engineering Task Force, Dec. 2002.*

(Continued)

*Primary Examiner*—Larry D Donaghue
*Assistant Examiner*—Ajay Bhatia

(57) ABSTRACT

The invention relates to a method for updating software that is stored in a computer of a data communication system, a computer to be used in a data communication system, and a data communication system comprising several computers and an administrative computer. Data indicating which transmission medium should be used for exchanging data that is used for updating or controlling the updating process is exchanged between one of the said computers and the administrative computer before software that is stored in said computer or in a storage device assigned thereto is updated.

19 Claims, 1 Drawing Sheet

U.S. PATENT DOCUMENTS

| | | | |
|---|---|---|---|
| 6,470,378 B1* | 10/2002 | Tracton et al. | 709/203 |
| 6,574,729 B1* | 6/2003 | Fink et al. | 713/1 |
| 6,668,278 B1* | 12/2003 | Yen et al. | 709/218 |
| 6,842,769 B1* | 1/2005 | Kim et al. | 709/203 |
| 6,963,914 B1* | 11/2005 | Breitbart et al. | 709/226 |
| 7,149,897 B2* | 12/2006 | Chincheck et al. | 709/227 |
| 2001/0056490 A1* | 12/2001 | Nagami et al. | 709/227 |
| 2002/0156870 A1* | 10/2002 | Boroumand et al. | 709/219 |
| 2002/0178261 A1* | 11/2002 | Chang et al. | 709/225 |
| 2002/0188937 A1* | 12/2002 | Webster et al. | 717/171 |
| 2003/0014526 A1* | 1/2003 | Pullara et al. | 709/227 |
| 2003/0154472 A1* | 8/2003 | Daase et al. | 717/176 |
| 2003/0169460 A1* | 9/2003 | Liao et al. | 358/426.08 |
| 2003/0212796 A1* | 11/2003 | Willard | 709/227 |
| 2003/0225892 A1* | 12/2003 | Takusagawa et al. | 709/227 |
| 2007/0006214 A1* | 1/2007 | Dubal et al. | 717/171 |
| 2007/0161411 A1* | 7/2007 | Liao et al. | 455/566 |
| 2007/0294684 A1* | 12/2007 | Kumashiro et al. | 717/168 |

FOREIGN PATENT DOCUMENTS

| | | |
|---|---|---|
| EP | 836138 A2 * | 4/1998 |
| EP | 0 935 373 A2 | 8/1999 |
| WO | WO 00/60784 | 10/2000 |

OTHER PUBLICATIONS

Yukio Hashimoto and Behcet Sarikaya, "Design of IP-based Routing in a LEO Satellite Network", Proc. of the 3 rd International Workshop on Satellite-Based Information Services, Mobicom'98, Oct. 1998.*

Nelson Minar, Kwindla Hultman Kramer, and Pattie Maes. Cooperating Mobile Agents for Dynamic Network Routing. In Alex Hayzelden, editor, Software Agents for Future Communications Systems, chapter 12. Springer-Verlag, 1999.*

* cited by examiner

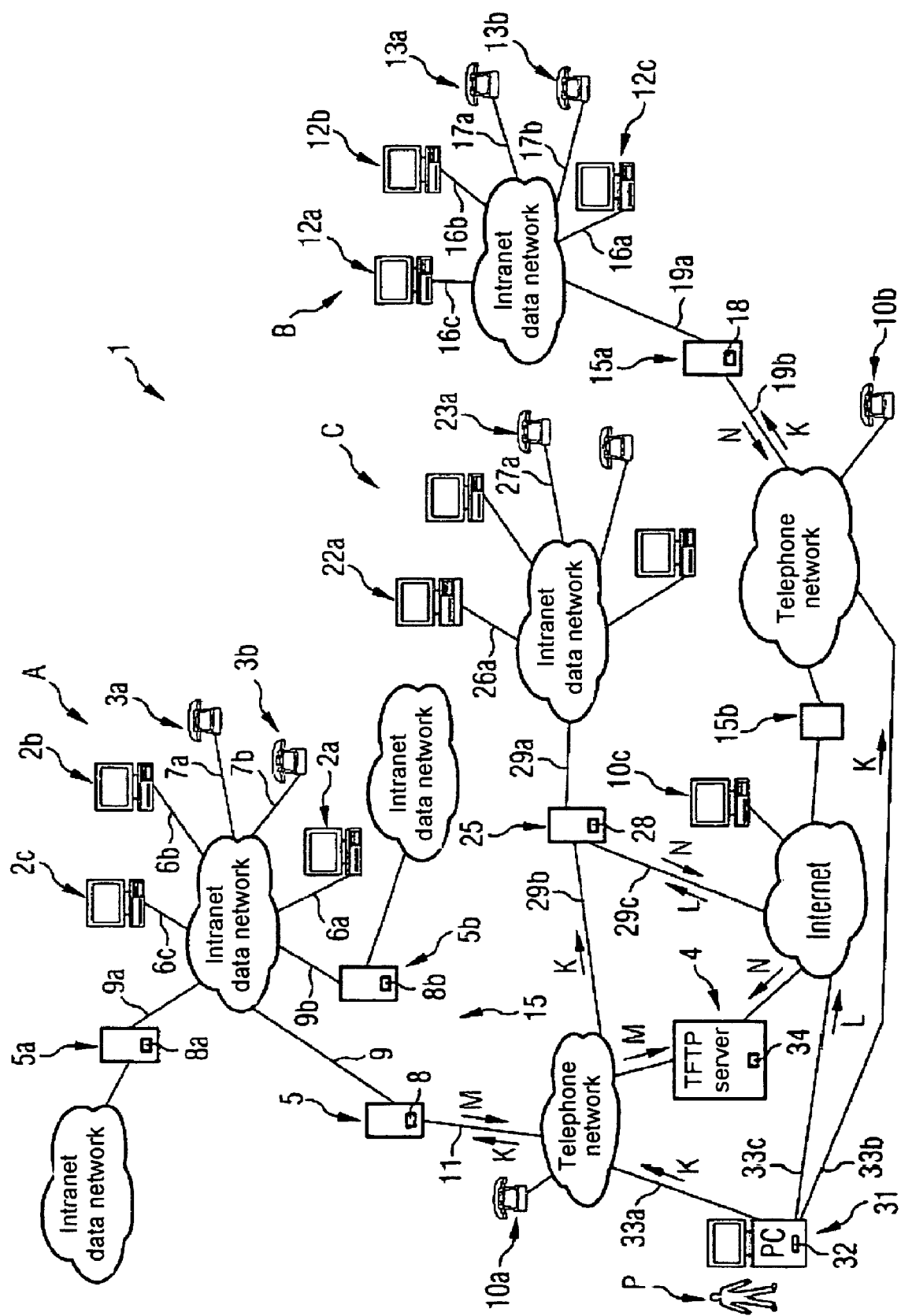

UPDATING OF SOFTWARE STORED IN A COMPUTER OF A DATA COMMUNICATION SYSTEM

CROSS REFERENCE TO RELATED APPLICATIONS

This application is the US National Stage of International Application No. PCT/DE03/02775, filed Aug. 20, 2003 and claims the benefit thereof. The International Application claims the benefits of German application No. 10241957.4 DE filed Sept. 10, 2002, both of the applications are incorporated by reference herein in their entirety.

FIELD OF INVENTION

The invention relates to a data communication system, a computer for use in a data communication system of said type, and a method for updating software stored on a computer of a data communication system according to the claims.

BACKGROUND OF INVENTION

The transmitting of data over the internet continues to increase in significance. The internet is a global data network or, expressed more precisely, comprises a plurality of different data networks interconnected my means of, for example, what are termed routers.

In each case one or more central computers, referred to in the relevant literature frequently as servers, communicate within the internet with clients located remotely from them, for example with a (stationary or portable) computer, a telephone, etc., and/or with further, central computers. Communication takes place using what are termed internet protocols, in particular the TCP/IP Protocol (Transmission Control Protocol/Internet Protocol). Software (what is termed a socket or TCP/IP stack) able to understand and evaluate the TCP/IP Protocol is loaded for this purpose on, for example, the respective client.

An increasing number of private data networks, which is to say data networks that can only be used by specific, authorized persons, are based on the technology and concept of the internet. Data networks of said type are referred to in the relevant literature as intranets. Within an intranet, in a manner analogous to the internet a relevant central computer, for example, communicates using internet protocols, in particular the TCP/IP Protocol, with clients located remotely from it, for example (stationary or portable) computers, telephones, etc. (and/or with further, central computers). For transmission, the relevant intranet data is divided in each case into individual packets then sent in an asynchronous manner.

Intranets are generally connected to the telephone network via the relevant, central computer, so are able to communicate with a further computer over the telephone network.

Data communication over the telephone network can take place on the basis of, for example, POTS (Plain Old Telephone Service) data transmission protocols or ISDN (Integrated Services Digital Network) data transmission protocols; alternatively on the basis of xDSL (x Digital Subscriber Line) data transmission protocols, for example by means of ADSL (ADSL=Asynchronous Digital Subscriber Line) data transmission. A plurality of frequency bands are employed in the case of data communication according to an xDSL protocol which are above the frequency bands used for POTS data transmission or, as the case may be, ISDN data transmission.

If the software loaded on a central intranet computer is to be updated, a further computer that initiates software updating can establish a POTS connection or an ISDN connection to the central intranet computer over the telephone network then transmit the software files required for updating to said central intranet computer.

The central intranet computer, and hence also the intranet clients connected thereto, for example the above-cited computers, telephones, etc. (and/or the further central computers connected to the central intranet computer) can additionally also be connected to the internet. The relevant central intranet computer can herein, for example, be continually connected to the internet (which is to say always on line). Central intranet computers of said type or, as the case may be, the intranet clients connected thereto have as a rule permanent IP (Internet Protocol) addresses consisting of a multi-digit number. Via the relevant address, other computers connected to the internet can establish a connection to the central intranet computer or, as the case may be, to the intranet clients connected thereto.

Other central intranet computers are not continually connected to the internet (which is to say are not always on line). Said computers or, as the case may be, the intranet clients connected thereto will be able to receive a temporary IP address assigned by the respective central (or any other) computer if they establish a connection to the internet (using, for example, a POTS, ISDN, or xDSL data transmission protocol) with, for instance, a corresponding central computer of an internet provider having been intermediately connected. Unlike in conventional telephone networks, there is thus in this case no fixed assignment between the respective device (here: the relevant central computer or, as the case may be, intranet client) and the call identification (here: an IP address consisting of a multi-digit number).

SUMMARY OF INVENTION

The object of the invention is to provide a novel data communication system, a novel computer, and a novel method for updating software stored on a computer of a data communication system.

The invention achieves this and further objects by means of the subjects of independent claims.

Advantageous developments of the invention are indicated in the dependent claims.

According to a basic concept underlying the invention, a data communication system having a plurality of computers and one administrative computer is provided wherein, prior to the updating of software stored on one of the computers or, as the case may be, on a storage device assigned thereto, data indicating which transmission medium is to be used for exchanging data used for updating or, as the case may be, for controlling the updating process is exchanged between the respective computer and the administrative computer.

Which transmission medium is to be used for exchanging data used for updating or, as the case may be, for controlling the updating process is particularly advantageously ascertained by the respective computer or, as the case may be, by special software-updating control software stored on the respective computer or, as the case may be, on the storage device assigned thereto.

The data used for updating or, as the case may be, for controlling the updating process can thereby be transmitted, adaptively, in each case over the (momentarily) optimal transmission medium using in particular the specific communication path over which the maximum data rate is (momentarily) achievable.

BRIEF DESCRIPTION OF THE DRAWING

The invention is explained in more detail below with the aid of an exemplary embodiment and the attached drawing.

FIG. 1: is a schematic of a data communication system according to an exemplary embodiment of the invention.

DETAILED DESCRIPTION OF INVENTION

In the data communication system 1 shown in FIG. 1 a plurality of clients 2a, 2b, 2c, 3a, 3b (a plurality of telephones 3a, 3b and a plurality of computers 2a, 2b, 2c in the present exemplary embodiment) are connected to a first intranet data network A.

The first intranet data network A has a telecommunication system or, as the case may be, a central computer 5 functioning as a telecommunication system, which computer functions for the clients 2a, 2b, 2c, 3a, 3b as a communication-control device, in particular as a telephone switching system, for connecting the first intranet data network A (or, as the case may be, the clients 2a, 2b, 2c, 3a, 3b connected thereto) to a telephone network (for example to the public telephone network).

Communication-control software is for this purpose loaded in a manner known per se on a storage device 8 of the central computer 5.

The central computer 5 or, as the case may be, the clients 2a, 2b, 2c, 3a, 3b are connected to the first intranet data network A my means of lines 6a, 6b, 6c, 7a, 7b, 9 connected to a corresponding bus system.

The clients 2a, 2b, 2c, 3a, 3b and the central computer 5 communicate using internet protocols, for example the Transmission Control Protocol (TCP) or, as the case may be, the Internet Protocol (IP). Software (what is termed a stack) able to understand and evaluate the relevant internet protocol is for this purpose loaded on the respective client 2a, 2b, 2c, 3a, 3b or, as the case may be, on the central computer 5.

To transmit data between the clients 2a, 2b, 2c, 3a, 3b and the central computer 5 over the first intranet data network A, the data is divided, as is customary in the case of internet protocols, into individual packets.

If one of the clients 2a, 2b, 2c, 3a, 3b communicates over the telephone network with an external device not connected directly to the first intranet data network A (with the telephone 10a device in the present exemplary embodiment), the data will be converted by the central computer 5 into corresponding POTS data or ISDN data and fed out to the telephone network over a line 11. Vice versa, the POTS data or, as the case may be, ISDN data received over the telephone network by the telephone 10a will be forwarded in the above-cited manner by the central computer 5 to the respective client 2a, 2b, 2c, 3a, 3b over the first intranet data network A.

As is further shown in the FIGURE, the data communication system 1 has a plurality of further intranet data networks apart from the first intranet data network A. A second intranet data network B and a third intranet data network C are shown in the present exemplary embodiment.

The second intranet data network B has, analogously to the first intranet data network A, a plurality of clients 12a, 12b, 12c, 13a, 13b, namely telephones 13a, 13b and computers 12a, 12b, 12c in the present exemplary embodiment.

As well as to a telephone network, the second intranet data network B can also be connected to the internet. Connection to the internet is effected over the telephone network and via a computer 15b of an internet service provider (ISP for short).

The second intranet data network B has a telecommunication system or, as the case may be, a central computer 15a functioning for the clients 12a, 12b, 12c, 13a, 13b as a communication-control device, in particular as a switching system for connecting the second intranet data network B (or, as the case may be, the clients 12a, 12b, 12c, 13a, 13b connected thereto) to the telephone network. The central computer 15a furthermore connects the second intranet data network B to the internet, with the telephone network being connected intermediately. The central computer 15a is not herein connected permanently to the internet, which is to say is not always on line.

Communication-control software is loaded in a manner known per se on a storage device 18 of the computer 15a to control communication between the clients 12a, 12b, 12c, 13a, 13b and the telephone network or, as the case may be (if required) with the internet.

The central computer 15a or, as the case may be, the clients 12a, 12b, 12c, 13a, 13b are connected to the second intranet data network B by means of lines 16a, 16b, 16c, 17a, 17b, 19a connected to a corresponding bus system.

The clients 12a, 12b, 12c, 13a, 13b and the central computer 15a communicate using internet protocols, for example the Transmission Control Protocol (TCP) or, as the case may be, the Internet Protocol (IP). Software (what is termed a stack) able to understand and evaluate the relevant internet protocol is for this purpose loaded on the respective client 12a, 12b, 12c, 13a, 13b or, as the case may be, on the central computer 15a.

If one of the clients 12a, 12b, 12c, 13a, 13b communicates with an external device which is not connected directly to the second intranet data network B but is connected to the telephone network (with a telephone 10b device in the present exemplary embodiment), the data will be converted by the central computer 15a into corresponding POTS data or ISDN data and fed out to the telephone network over a line 19b. Vice versa, the POTS data or, as the case may be, ISDN data received over the telephone network by the telephone 10b will be forwarded in the above-cited manner by the central computer 15a to the respective client 12a, 12b, 12c, 13a, 13b over the second intranet data network B.

If, by contrast, one of the clients 12a, 12b, 12c, 13a, 13b is to communicate with a device connected to the internet (with a computer 10c device in the present exemplary embodiment), a telephone connection (for example a POTS, ISDN, or xDSL connection, in particular an ADSL connection) will be set up by the central computer 15a to the ISP computer 15b, which will then assign a temporary IP address to the central computer 15a or, as the case may be, the respective client 12a, 12b, 12c, 13a, 13b. The ISP computer 15b will furthermore initiate the establishment of a corresponding internet connection so that data can be exchanged between the respective client 12a, 12b, 12c, 13a, 13b and the computer 10c over the internet and the telephone network, with the ISP computer 15b and the central intranet computer 15a having been intermediately connected.

The number of IP addresses to be administered by the ISP computer 15b is reduced through the use of temporary IP addresses instead of IP addresses permanently assigned to a specific central computer or, as the case may be, client.

As is further shown in the FIGURE, the third intranet data network C has, analogously to the first and second intranet data network A, B, a plurality of clients 22a, 23a, namely a telephone 23a and a computer 22a in the present exemplary embodiment.

The third intranet data network C is connected to the telephone network and additionally to the internet. In contrast to the second intranet data network B, the third intranet data network C is connected directly and continually to the internet by means of a corresponding dedicated line 29c.

The third intranet data network C has a telecommunication system or, as the case may be, a central computer 25 functioning as a telecommunication system, which computer functions for the clients 22a, 23a as a communication-control device, in particular as a switching system, for connecting the intranet data network (or, as the case may be, the clients 22a, 23a connected thereto) to the telephone network or the internet. The central computer 25 is permanently connected to the internet over the dedicated line 29c (which is to say is always on line).

Communication-control software is loaded in a manner known per se on a storage 28 of the computer 25.

The central computer 25 or, as the case may be, the clients 22a, 23a are connected to the third intranet data network C by means of lines 26a, 27a, 29a connected to a corresponding bus system.

The clients 22a, 23a and the central computer 25 communicate using internet protocols, for example the Transmission Control Protocol (TCP) or, as the case may be, the Internet Protocol (IP). Software (what is termed a stack) able to understand and evaluate the relevant internet protocol is for this purpose loaded on the respective client 22a, 23a or, as the case may be, on the central computer 25.

If one of the clients 22a, 23a communicates with an external device which is not connected directly to the intranet data network but is connected to the telephone network (with the telephone 10a device in the present exemplary embodiment), the data will be converted by the central computer 25 into corresponding POTS data or ISDN data and fed out to the telephone network over a line 29b. Vice versa, the POTS data or, as the case may be, ISDN data received over the telephone network by the telephone 10a will be forwarded in the above-cited manner by the central computer 25 to the respective client 22a, 23a over the third intranet data network C.

The central intranet computer 25 or, as the case may be, the clients 22a, 23a connected thereto have a permanent IP address consisting of a multi-digit number so that, following establishment of the corresponding internet connection, data can be exchanged between a device connected to the internet (for example the computer 10c) and the central computer 25 or, as the case may be, between the device (for example the computer 10c) and the respective client 22a, 23a, with, in that case, the computer 25 having been intermediately connected.

An administrative computer 31 (here: a PC, standing for Personal computer) and a server computer 4 (here: a TFTP, standing for Trivial File Transfer Protocol, server computer) is provided in the present exemplary embodiment for updating the communication-control software stored on the storage devices 8, 18, 28 of the central computers 5, 15a, 25 (or for updating any other software stored on the relevant storage devices 8, 18, 28). Any other server computer, for example an ordinary web server computer, in particular an HTTP server computer or, as the case may be, HTTPS server computer, can also be used instead of a TFTP server computer.

The server computer 4 and/or the administrative computer 31 can be located remotely from each other and/or remotely from some or all of the central computers 5, 15a, 25.

Updating of the software on the central computers 5, 15a, 25, in particular exchanging of the data required therefore, takes place in the data communication system 1 shown in an adaptive manner, in particular in a manner ensuring as fast as possible a data transmission rate.

As can be seen from the FIGURE and the description, all central computers 5, 15a, 25 are accessible over the telephone network, which is to say via a call identification permanently assigned to the respective computer 5, 15a, 25 (here: a telephone number). Only some of the central computers, namely the central computers 15a and 25, are by contrast accessible over the internet.

Stored on a storage device 32 of the administrative computer 31 is a list of those central computers 5, 15a, 25 or, as the case may be, the call identifications assigned thereto, whose software can be updated in a process initiated from the administrative computer 31.

In the present exemplary embodiment the administrative computer 31 is connected to the telephone network and (temporarily or in a stationary manner) to the internet via corresponding lines 33a, 33b, 33c.

The respective central computer 5, 15a, 25 for which software updating is to be performed can be selected by means of appropriate selection entries made on the administrative computer 31 by a user P. A telephone connection, in particular a POTS or ISDN telephone connection, will then be set up to the selected central computer 5, 15a, 25 automatically initiated by the administrative computer 31. This is done by dialing the telephone number, contained in the list, assigned to the respective computer 5, 15a, 25.

Special, separate software-updating control software is stored on the corresponding storage devices 8, 18, 18 of the central computers 5, 15a, 25. Said software-updating control software can alternatively also be integrated in, for example, other software components, for example the communication-control software, stored on the respective storage device 8, 18, 18.

The software-updating control software will be launched once a telephone connection has been set up between the respective central computer 5, 15a, 25 and the administrative computer 31 (see step K or, as the case may be, arrow K). Said control software will then ascertain which communication paths are momentarily available to the respective central computer 5, 15a, 25. The central computer can, for example (as is the case, for instance, with the central computer 5), be embodied or, as the case may be, set up solely for communicating over a corresponding telephone connection, routed in this case over the line 11. The relevant central computer can alternatively (as is the case, for instance, with the central computer 25) be additionally connected to the internet, which is to say embodied or, as the case may be, set up in such a way as to be able to communicate permanently over a corresponding internet connection.

It is also possible for the relevant central computer to be embodied or, as the case may be, set up (as is the case, for instance, with the central computer 15a) for communicating over a corresponding telephone connection and additionally to be capable of being connected to the internet but momentarily not to be connected thereto (offline condition). The relevant central computer will then momentarily not be able to communicate over the internet. The software-updating control software can in this case initiate the immediate connection of the central computer 15a to the internet.

The relevant central computer can furthermore be embodied or, as the case may be, set up (as is the case, for instance, with the central computer 15a) for communicating over a corresponding telephone connection and be momentarily (but not continually) online, which is to say connected to the internet (or can be put into such a condition in the above-described manner initiated by the software-updating control software). The relevant central computer will then momentarily be able to communicate over a corresponding internet connection.

When the communication paths momentarily available to the respective central computer 5, 15a, 25 have been ascertained, then, if it has been ascertained that several communication paths are available, one of said ascertained communication paths will be selected by the software-updating control software, in particular the one over which momentarily the fastest data rate can be achieved.

The ascertained result is then, initiated by the software-updating control software, notified to the administrative computer 31 by means of corresponding data exchanged over the telephone connection existing between the respective central computer 5, 15a, 25 and the administrative computer 31. This takes place in particular by means of data identifying the type of selected communication path (POTS telephone connection or, as the case may be, ISDN telephone connection/fixed IP connection/temporary IP connection) and/or by means of data identifying the call identification (telephone number/fixed IP address/temporary IP address) assigned to the selected communication path.

If the selected communication path does not correspond to the communication path used momentarily for communication between the respective central computer 5, 15a, 25 and the administrative computer 31 (which is to say to the above-cited telephone connection), then, initiated by the administrative computer 31 or, alternatively, by the respective central computer 5, 15a, 25, a new connection will be set up between the administrative computer 31 and the respective central computer 25. For example an internet connection will be set up (see step L or, as the case may be, arrow L) using the conveyed (fixed or temporary) IP address.

Further data relating to the control of the updating process of the (communication-control) software stored on the storage device 8, 18, 28 of the respective central computer 5, 15a, 25 is then exchanged between the respective central computer 5, 15a, 25 and the administrative computer 31 over the selected communication path, which is to say either over the new communication path or, if the original communication path corresponds to the selected communication path, over the communication path originally existing between the respective central computer 5, 15a, 25 and the administrative computer 31.

Said (updating-process control) data can indicate:
the precise time at which updating is to be performed, and/or
the (communication-control) software version momentarily stored on the respective storage device 8, 18, 28, and/or
information on whether all the (communication-control) software or only individual components of the (communication-control) software is/are to be updated or, as the case may be, which components are to be updated, and/or
the communication path over which communication is to take place with the server computer 4 (this communication path can correspond, for example, to the selected communication path), and/or
depending on the respectively indicated communication path, the corresponding call identification of the server computer 4, in particular its telephone number, IP address, or URL, and/or,
the path or, as the case may be, file name(s) under which the relevant files required for updating the (communication-control) software are stored on the server computer 4.

A part of the (updating-process control) data, for example the data indicating which precise software components are to be updated, can be entered or, as the case may be, selected by the user P on the administrative computer 31, in particular (when the data is transmitted over the internet) by means of appropriate entries made on a browser displayed thereon.

Other (updating-process control) data can be stored in advance on, for example, the storage device 32 of the administrative computer 31 or can be ascertained by means of corresponding control software stored on the storage device 32 of the administrative computer 31 (for example the corresponding call identification, in particular the telephone number or IP address or, as the case may be, URL of the server computer 4), and/or can be stored in advance on the respective storage device 8, 18, 28 of the corresponding central computer 5, 15a, 25 or ascertained by means of the corresponding control software stored on the respective storage device 8, 18, 28 of the corresponding central computer 5, 15a, 25 (for example the data identifying the communication path to be used for communicating with the server computer 4).

A connection is thereupon set up through a process initiated by the respective central computer 5, 15a, 25, in particular by the software-updating control software, over the selected communication path between the respective central computer 5, 15a, 25 and the server computer 4. This takes place, for example, proceeding from the central computer 15a or 25 using the IP address or, as the case may be, URL (see step N or, as the case may be, arrow N) conveyed by the administrative computer 31 or proceeding from the central computer 5 using the telephone number (see step M or, as the case may be, arrow M) conveyed by the administrative computer 31.

Further (updating-process control) data is exchanged between the respective central computer 5, 15a, 25 and the server computer 4 when the corresponding connection has been set up. Said further (updating-process control) data can indicate, for example, the path or, as the case may be, file name(s) of the file or, as the case may be, files requiring to be transmitted to the respective central computer 5, 15a, 25 for updating the (communication-control) software, and/or the precise time at which the corresponding files are to be conveyed.

The corresponding file(s) stored, for example, on a storage device 34 of the server computer 4 is/are then transmitted to the respective central computer 5, 15a, 25 over the corresponding connection. The (communication-control) software is then updated there in a manner known per se under the control of the software-updating control software and using the file(s) conveyed by the server computer 4.

Data identifying the status of updating (for instance data indicating whether updating could or could not be performed successfully) is thereupon conveyed, for example initiated by the software-updating control software, over the connection existing between the respective central computer 5, 15a, 25 and the administrative computer 31 (or, alternatively, over a connection then newly set up) from the respective central computer 5, 15a, 25 to the administrative computer 31. This takes place using an administrative-computer-updating status-conveying destination address which, as part of the (updating-process control) data, has been conveyed in advance to the respective central computer 5, 15a, 25 by the administrative computer 31.

One or more of the intranet data networks A, B, C can, in an alternative exemplary embodiment, be connected to further intranet data networks over corresponding lines and corresponding, further central computers (here, for example, the intranet data network A over lines 9a, 9b and further central computers 5a, 5b), which is to say can be combined therewith into an aggregate network.

Stored on corresponding storage devices 8a, 8b of the further central computers 5a, 5b is communication-control software corresponding to the communication-control software stored on the storage device 8 of the central computer 5 or, as the case may be, being identical thereto.

The respective central computer (in this case the central computer 5) or, as the case may be, the software-updating control software stored on its storage device 8, can then, with the aid of corresponding data exchanged with the further central computers 5a, 5b over the lines 9a or, as the case may be, 9b, cause the communication-control software stored on the storage devices 8a, 8b of the further central computers 5a, 5b to be updated accordingly, as, previously, the communication-control software stored on the storage device 8 of the central computer 5. This is done by means of forwarding by the central computer 5 of the corresponding file(s) required for updating and stored on the storage device 34 of the server computer 4 to the further central computers 5a, 5b, where, using the file(s) conveyed by the central computer 5, the communication-control software stored on the corresponding storage device 8a, 8b is updated in a manner known per se.

The invention claimed is:

1. A data communication system for updating a software stored in a storage device of a first computer, comprising
   an administrative computer for updating the software;
   an indicator indicating a plurality of transmission media available for updating software that is exchanged between the first computer and the administrative computer prior to the update;
   a control software configured to compare a respective data rate provided by respective ones of the plurality of transmission media available for updating software, the control software further configured to select one of the plurality of transmission media based on a result of the data rate comparison; and
   a data connection operatively connecting the first computer and the administrative computer via the selected transmission medium to transmit data between the computer and the administrative computer.

2. The data communication system according to claim 1, wherein the indicator is exchanged over a predetermined transmission medium.

3. The data communication system according to claim 2, wherein the predetermined transmission medium is different from the transmission medium.

4. The data communication system according to claim 2, wherein the predetermined transmission medium is a telephone connection.

5. The data communication system according to claim 1, wherein the transmission medium is an internet connection or a telephone connection.

6. The data communication system according to claim 5, wherein the internet connection is fixed and an IP address assigned to the first computer is a fixed IP, or the internet connection is temporary and an IP address assigned to the first computer is a temporary IP address.

7. The data communication system according to claim 1, wherein the control software indicates a time to perform the software update.

8. The data communication system according to claim 1, wherein the control software indicates a call identification that is assigned to the additional first computer, the call identification selected from the group consisting of telephone number, internet protocol address, and uniform resource locator address.

9. The data communication system according to claim 1, wherein a second transmission medium for exchanging data between the first computer and the additional first computer is conveyed via the control software.

10. The data communication system according to claim 9, wherein the second transmission medium is the same as the predefined transmission medium.

11. The data communication system according to claim 9, wherein the second transmission is different than the transmission medium and the predefined transmission medium.

12. The data communication system according to claim 9, wherein a file for updating software is stored on the additional server and wherein the file first computer is transmitted to the first computer over the second transmission medium.

13. The data communication system according to claim 12, wherein the additional first computer is a trivial file transfer protocol server first computer or a web server first computer.

14. The data communication system according to claim 1, wherein the first computer is a telecommunication system.

15. The data communication system according to claim 1, wherein the software to be updated is a communication-control software.

16. The data communication system according to claim 1, wherein the first computer is part of a first data network and functions as a central first computer for the first data network.

17. The data communication system according to claim 1, wherein the first data network is connected to a second data network forming an aggregate network and wherein the first computer initiates updating the software stored on a second computer in the second network.

18. A first computer in a data communication system, comprising:
   a processor;
   a storage device operatively connected to the processor;
   a first data connection operatively connected to a server computer over a transmission medium for exchanging data for updating a first software, the transmission medium ascertained by the computer occurring prior to establishing the first connection, wherein the ascertaining of the transmission medium comprises a comparison of a respective data rate provided by respective ones of a plurality of transmission media available for updating software, and further comprises selecting the transmission medium for updating software based on a result of the data rate comparison;
   a second software controlling the first software update, the second software exchanged between an administrative computer and the first computer;
   a call identification of the first computer selected from the group consisting of telephone number, internet protocol address, and uniform resource locator address; and
   a time indicator indicating a time to update the first software by the second software.

19. A method for updating software stored on a first computer of a data communication system having an administrative computer and a server first computer, comprising:
   indicating a plurality of transmission media available for exchanging data between the first computer and the administrative computer, the indication occurring prior to the updating the software stored on the first computer;
   comparing a respective data rate provided by respective ones of the plurality of transmission media available for updating software;
   selecting one of the plurality of transmission media available for updating software based on a result of the data rate comparing; and
   establishing a data connection between the first computer and the additional server first computer over the transmission medium.

* * * * *